United States Patent [19]

McKay

[11] 4,153,536

[45] May 8, 1979

[54] CRACKING WITH CATALYST MODIFIED BY ANTIMONY THIOPHOSPHATE

[75] Inventor: Dwight L. McKay, Bartlesville, Okla.

[73] Assignee: Phillips Petroleum Company, Bartlesville, Okla.

[21] Appl. No.: 911,581

[22] Filed: Jun. 1, 1978

Related U.S. Application Data

[62] Division of Ser. No. 768,001, Feb. 11, 1977, Pat. No. 4,111,845.

[51] Int. Cl.$^2$ ............... C10G 11/06; B01J 8/24; B01J 23/18
[52] U.S. Cl. .................. 208/120; 208/48 AA; 208/114; 208/121; 208/124; 252/411 R; 252/437; 252/439; 252/456; 252/464
[58] Field of Search .................. 208/48, 113–121; 252/415–418, 436–437, 439, 456, 464, 477 R

[56] References Cited

U.S. PATENT DOCUMENTS

| | | | |
|---|---|---|---|
| 3,206,391 | 9/1965 | Gutberlet et al. | 208/110 |
| 3,248,316 | 4/1966 | Barger et al. | 208/58 |
| 3,711,422 | 1/1973 | Johnson et al. | 252/414 |
| 3,720,724 | 3/1973 | Tabler | 260/666 D |
| 3,979,472 | 9/1976 | Butter | 260/668 R |
| 3,994,832 | 11/1976 | Antos | 252/464 |
| 4,002,698 | 1/1977 | Kaeding | 260/671 M |
| 4,025,458 | 5/1977 | McKay | 252/416 |
| 4,036,740 | 7/1977 | Readal et al. | 208/120 |

*Primary Examiner*—Delbert E. Gantz
*Assistant Examiner*—G. E. Schmitkons

[57] ABSTRACT

Prevention of detrimental effect of metals such as nickel, vanadium and iron on the activity of a cracking catalyst when used in a cracking process having essentially no hydrogen added thereto is achieved by using in the cracking process novel cracking catalyst having less than 40 weight percent zeolite content and including antimony metal or a compound of antimony prior to subjecting the cracking catalyst to hydrocarbon cracking conditions.

13 Claims, No Drawings

CRACKING WITH CATALYST MODIFIED BY ANTIMONY THIOPHOSPHATE

This application is a divisional of application Ser. No. 768,001, filed Feb. 11, 1977, now U.S. Pat. No. 4,111,845.

This invention relates to hydrocarbon conversion. More specifically this invention relates to the cracking of hydrocarbons in the absence of added hydrogen.

BACKGROUND OF THE INVENTION

It is well known in the art that hydrocarbon feedstocks containing varying amounts of metals such as nickel, vanadium and iron cause deterioration of the cracking catalyst during the cracking process. In fact, some oils contain these metals in such a high concentration that they cannot be economically cracked into gasoline and other fuels. The metals accumulate on the cracking catalyst and cause increased hydrogen production and coke laydown on the cracking catalyst, thereby adversely affecting the yield of desired products.

It has heretofore been proposed to passivate these metals by treating the contaminated catalyst with antimony oxide or a compound convertible to antimony oxide. While this process has proven to be very successful, there is required the incurring of additional cost due to installation of additional feeding means to introduce the passivatng agent into the cracking system.

THE INVENTION

It is thus an object of this invention to provide a novel cracking process.

Another object of this invention is to provide a new cracking catalyst.

A further object of this invention is to provide a process for the production of novel cracking catalyst.

Another object of this invention is to inhibit the adverse effects of metals such as nickel, vanadium and iron on cracking catalyst.

Another object of this invention is to extend the life of a cracking catalyst so as to prolong the period of use of the catalyst in a cracking process.

A still further object of this invention is to provide a cracking process wherein there is achieved a reduction in hydrogen production, an increase in gasoline yield and a reduction in coke production.

These and other objects, advantages, details, features and embodiments of this invention will become apparent to those skilled in the art from the following detailed description of the invention, the examples and the appended claims.

In accordance with this invention, I have now discovered that decline in performance of cracking catalyst due to deposit thereon of a metal such as nickel, vanadium or iron during use in a cracking process is inhibited by addition of antimony to unused cracking catalyst prior to exposure of same to cracking conditions.

More specifically I have discovered that the rate of deactivation of the cracking catalyst caused by contact thereof with a contaminating metal such as nickel, vanadium or iron is considerably reduced by the incorporation of antimony onto the unused cracking catalyst prior to use of same in a cracking process.

In accordance with one embodiment of this invention, there is now provided a cracking catalyst consisting essentially of an unused catalytic cracking material useful for cracking of hydrocarbons essentially in the absence of added hydrogen, and containing less than about 40 weight % zeolite and containing antimony in an amount sufficient to inhibit detrimental effect of contaminant metals when the cracking catalyst is employed in a hydrocarbon cracking process.

Through the use of a catalyst system for cracking of hydrocarbon feedstocks in accordance with the present invention, there is achieved a prolonged period of use of the cracking catalyst. In addition, the rate of makeup catalyst introduction into a cyclic cracking process in the absence of added hydrogen can be reduced without losing activity or conversion.

The term "unused" catalytic cracking material as used herein refers to a cracking catalyst material that is useful for cracking hydrocarbons in the absence of added hydrogen, but which has not been used in such a cracking process. Unused catalytic cracking material thus is intended to encompass steam aged cracking catalysts. The unused catalytic cracking material referred to can be any conventional cracking catalyst.

The unused catalytic cracking material can be any of those cracking catalysts conventionally employed in the catalytic cracking of hydrocarbons boilng above 400° F. (204° C.) for the production of gasoline, motor fuel, blending components and light distillates. These conventional cracking catalysts generally contain silica, or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into which antimony can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. Other cracking catalysts into which antimony can be incorporated include crystalline aluminosilicate zeolites having the mordenite crystal structure. The unused catalytic cracking material employed will generally be in particulate form having a particle size principally within the range of about 10 to about 200 microns.

The unused catalytic cracking material as employed in the present invention contains essentially no nickel, vanadium or iron. Particularly and preferably, the nickel, vanadium and iron metals content of the unused catalytic cracking material which constitutes the major portion of the cracking catalyst of this invention is defined by the following limits:

nickel—0–0.02 wt. %
vanadium—0–0.06 wt. %
iron—0–0.8 wt. %

The weight percentage in this table relates to the total weight of the unused catalytic cracking material including the metals, nickel, vanadium and iron, but excluding the added antimony. The contents of these metals on the cracking catalyst can be determined by standard methods well known in the art, e.g., by atomic absorption spectroscopy or by X-ray fluorescence spectroscopy.

The unused catalytic cracking material can vary in pore volume and surface area. Generally, however, the unused cracking catalyst before any steam aging thereof, will have a pore volume in the range of about 0.1 to about 1 cc/g. The surface area of this unused catalytic cracking material generally will be in the range of about 50 to about 500 m²/g.

Although the amount of antimony or antimony compound incorporated into the unused catalytic cracking material is not particularly critical, the amount will generally be such as to provide about 0.005 to about 5 wt. % of antimony, calculated as elemental antimony, based on the weight of the unused catalytic cracking material employed. The particularly preferred range for the content of antimony or antimony compound, again calculated as elemental antimony, is in the range of about 0.02 to about 1.5 wt. %.

The form in which antimony is present in the cracking catalyst or is employed in the preparation of the antimony-containing catalysts is not critical. Thus, elemental antimony, inorganic antimony compounds, and organic antimony compounds as well as mixtures thereof, are suitable sources of antimony. The term "antimony" generally refers to any one of these antimony sources. Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride, and antimony pentachloride; antimonyl halides such as antimonyl chloride and antimonyl trichloride; antimonides such as indium antimonide; and the like. Of the inorganic antimony compounds, those which do not contain halogen are preferred. Although organic antimony compounds for use in the preparation of the antimony-containing catalysts preferably contain about 3 to about 54 carbon atoms for reasons of economics and availability, organic antimony compounds outside this range also are applicable. Thus, organic polymers containing antimony can be employed as the organic antimony compound. In addition to carbon and hydrogen, the organic antimony compound can contain elements such as oxygen, sulfur, nitrogen, phosphorus, or the like. Examples of some organic antimony compounds which can be used in the preparation of the antimony-containing catalysts include antimony carboxylates such as antimony triformate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(0-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate), and antimony tris(butylthiocarbamate); antimony phosphites such as antimony tris(diphenyl phosphite); antimony phosphates such as antimony tris(dipropyl phosphate); antimony thiophosphates such as antimony tris(O,O-dipropyl thiophosphate) and antimony tris(O,O-dipropyl dithiophosphate); and the like. Mixtures of two or more applicable substances comprising antimony can be employed. Since the main purpose of the antimony source in the unused catalytic cracking material is to prevent or mitigate the otherwise (without the antimony source) occurring undesirable effects of contaminating metals, in particular, the increased hydrogen and coke production and the reduced gasoline yield caused by these contaminating metals, the antimony source utilized and incorporated into the unused or fresh cracking catalyst should be essentially free of contaminating metals. The antimony source thus should essentially contain no nickel, no vanadium and no iron.

The improved catalyst of this invention can be prepared by combining an antimony source and the unused catalytic cracking material. The antimony source can be combined with the unused catalytic cracking material in various ways. The antimony source can, e.g., be mixed with the unused cracking catalyst, the cracking catalyst can be impregnated with the antimony source, the antimony source can be precipitated from a solution onto the cracking catalyst, or the unused catalytic cracking material can be exposed to an antimony source in vapor form to deposit this antimony source onto the unused cracking catalyst. The unused catalytic cracking material can be combined with an antimony source by admixing the catalytic cracking material and a solid antimony source in the dry stage. It is also within the scope of this invention to admix the unused catalytic cracking material and a solid particulate antimony source in a slurry with a liquid carrier and to remove at least a portion of this liquid carrier. For this mixing process, a finely divided solid antimony source preferably consists essentially of normally solid particles in the size range of particles passing through a 100 mesh (U.S. standard) sieve. The particles in the range of 100 to 425 mesh (U.S. standard) would be useful, although finer particles can readily be employed. The actual mixing of the unused catalytic cracking material particles and the solid antimony source particles can be carried out in a variety of ways. For example, the antimony source in finely divided form can be mixed with the unused catalytic cracking material by rolling, shaking, stirring and similar procedures.

Another and presently preferred procedure to add an antimony source to the unused catalytic cracking material is by impregnation. To do this the antimony source can be dissolved in a solvent such as water, hydrocarbons or an aqueous acid depending upon the nature of the antimony source. The resulting solution is mixed with the unused catalytic cracking material and the solvent is thereafter removed by volatilization.

Under certain circumstances, it may be desirable to have antimony present on the unused catalytic cracking material in an essentially oil insoluble state. In some cases it is preferred to deposit from the beginning the antimony source onto the unused catalytic cracking material in an oil insoluble form. If the antimony source deposited exhibits, however, a substantial solubility in the hydrocarbons to be cracked, the antimony source in this case should be converted to a form less soluble and preferably essentially insoluble in the hydrocarbon feedstock at cracking temperatures before the antimony-containing catalyst is employed in a cracking step. To achieve this, the antimony-containing catalyst can, for instance, be heated at an elevated temperature, generally in the range of about 800° F. (427° C.) to about 1600° F. (871° C.) for a period of about 3 minutes to about 30 minutes and in the presence of a free oxygen-containing gas such as air. Such a heating step can be conducted as a step separate or remote from the catalytic cracking and catalyst regeneration. Preferably, however, such a step is carried out in the catalyst regenerator used to regenerate spent catalyst from the cracking step. Regardless of the specific oil solubility situation just mentioned, all of the antimony-containing cracking catalysts in accordance with this invention can be subjected to a heating step prior to use in a cracking process.

The quantity of antimony or antimony compound is added to the unused catalytic cracking material in such an amount that the unused catalytic cracking material is combined with sufficient antimony to inhibit the detrimental effect of contaminating metals when the catalyst is used in a hydrocarbon cracking process essentially in the absence of added hydrogen. Generally, the quantity of antimony or antimony compound used will be such as to result in the unused catalytic cracking material containing about 0.005 to about 5 wt. % of antimony calculated as elemental antimony and based on the unused catalytic cracking material without the antimony as 100 wt. %. The particularly preferred concentration of the antimony source calculated as elemental antimony is in the range of about 0.02 to about 1.5 wt. % antimony.

Antimony solutions that are employed either for the impregnation of the catalyst or for the precipitation of an antimony compound onto the catalyst, preferably will have an antimony concentration of at least about 0.01 wt. %, based on the total solution used. The actually employed concentration has its upper limit in the solubility of the antimony compound used and is determined in part by the ease of mixing. If a very low antimony concentration on the catalyst is desired, a more diluted solution is generally utilized. Also a more even distribution of the antimony throughout the cracking catalyst can be achieved by utilizing a more diluted solution. The concentration of the solution used is also influenced by the porosity of the unused or fresh cracking catalyst. The higher this prosity or the larger the liquid volume is that can be accepted ("absorbed") by the fresh or unused cracking catalyst, the more diluted the antimony solution used to obtain a certain percentage of antimony on the cracking catalyst will be. Correspondingly, the total volume of this solution used will be larger for the same weight of catalyst if the porosity is higher than that of a comparison catalyst.

Among the various procedures to prepare the antimony-containing catalyst of this invention by combining antimony and an unused catalytic cracking material, the admixing of solid unused catalytic cracking material catalyst and a finely divided antimony source and the impregnation of an unused catalytic cracking material with a solution of the antimony source followed by the removal of the solvent, are the two presently preferred methods to prepare the cracking catalyst of this invention.

Yet a further embodiment of this invention resides in a cracking process. This cracking process is basically an improvement of a known cracking process carried out in the absence of added hydrogen. This process is improved in accordance with this invention by the use of a novel catalyst as defined above. More specifically, a hydrocarbon feedstock is cracked into lighter hydrocarbon materials by contacting this feedstock with an unused catalytic cracking material containing antimony and in the absence of added hydrogen and recovering the cracked materials.

A preferred embodiment of the cracking process of this invention utilizes a cyclic flow of catalyst from a cracking zone to a regeneration zone. In this process, a hydrocarbon feedstock containing contaminating metals such as nickel, vanadium or iron is contacted in a cracking zone under cracking conditions and in the absence of added hydrogen with an antimony containing cracking catalyst as defined above; a cracked product is obtained and recovered; the cracking catalyst is passed from the cracking zone into a regeneration zone; in the regeneration zone the cracking catalyst is regenerated by contacting the cracking catalyst with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst by unused antimony-containing cracking catalyst continuously or intermittently. Generally, about 0.5 to about 6 wt. % of the total cracking catalyst is replaced daily by a fresh cracking catalyst. The actual quantity of the catalyst replaced depends particularly upon the quality of feedstock used. The makeup quantity of cracking catalyst can be added at any location to the process. Preferably, however, the cracking catalyst that is makeup catalyst is introduced into the regenerator in a cyclic cracking process.

Also, it is to be understood that the used cracking catalyst coming from the cracking zone before it is introduced into the regenerator is stripped of essentially all entrained liquid or gaseous hydrocarbons. Similarly, the regenerated catalyst can be stripped of any entrained oxygen before it reenters the cracking zone. The stripping is generally done with steam.

The specific conditions in the cracking zone and in the regeneration zone are not critical and depend upon several parameters such as the feedstock used, the catalyst used and the results desired. Preferably and most commonly, the cracking and regeneration conditions are within the following ranges:

|  | Cracking Zone: |
| --- | --- |
| Temperature: | 800° F. to 1200° F. (427°–649° C.) |
| Pressure: | Subatmospheric to 3,000 psig |
| Catalyst/Oil Ratio: | 3/1 to 30/1, by weight |
|  | Regeneration Zone: |
| Temperature: | 1000° F. to 1500° F. (538° C. to 816° C.) |
| Pressure: | Subatmospheric to 3,000 psig |
| Air: (60° F. 1 atm) | 100 – 250 ft$^3$/lb coke (6.2–15.6) m$^3$/kg coke) |

The feedstocks employed in the catalytic cracking process of this invention contain metal contaminants such as nickel, vanadium and iron. The oil feedstocks include those which are conventionally utilized in catalytic cracking processes to produce gasoline and light distillate fractions from heavier hydrocarbon feedstocks. The feedstocks have an initial boiling point above about 400° F. (204° C.) and include fluids such as gas oils, fuel oils, topped crudes, shale oils, oils from tar sands, oils from coal and the like. By "topped crude" are meant those oils which are obtained as the bottoms of a crude oil fractionator.

Typically the feedstock utilized in the process of this invention will contain one or more of the metals nickel, vanadium and iron within the ranges shown in the following table:

Table

| | Metal Contents of Feedstocks |
|---|---|
| Nickel | 0.2 to 100 ppm[1] |
| Vanadium | 0.2 to 500 ppm |
| Iron | 0.2 to 500 ppm |
| Total metals | 0.2 to 1100 ppm[2] |

[1] These ppm contents refer to the feedstock as used.
[2] Total metals in this table and elsewhere refers to the sum of the nickel, vanadium and iron contents in the feedstock that is effective in contaminating the catalyst; the total metals content can be determined in accordance with methods well known in the art, e.g., by atomic absorption spectroscopy.

One of the most important embodiments of this invention resides in a heavy oil cracking process. The known commercial heavy oil cracking process is capable of cracking heavy oils having a metals content of up to 80 ppm of total effective metals, i.e., metals in any form detrimental to the cracking process. Economically marginal results are obtained with oils having 40 to 80 ppm of total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. The total effective metals content of the oil given above is determined by methods such as atomic absorption spectroscopy. Thus, known heavy oils with total metals contents from 80 to 300 ppm that heretofore could not be directly used for fuel production and in particular for gasoline production in accordance with this invention can be cracked to yield gasoline and other fuel blending components. Most preferably the quantity of antimony on the unused catalytic cracking material used in the process of this invention for cracking these heavily metal loaded oils is related to the average total effective metals content of the feedstock as shown in the following table.

Table

| Total Effective Metals in Feedstock (ppm) | Antimony Concentration (Weight % Based on Unused Antimony Free Catalytic Cracking Material) |
|---|---|
| 40 – 100 | 0.05 – 0.8 |
| 100 – 200 | 0.1 – 1 |
| 200 – 300 | 0.15 – 1.5 |
| 300 – 800 | 0.2 – 2 |

The invention will be yet more fully understood from the following specific examples that are intended to illustrate the preferred embodiments of this invention, not, however, to limit the scope of protection thereof.

EXAMPLE

1. Catalyst Preparation

Several batches of a commercially available unused catalytic cracking material (F950, made by the Filtrol Corporation) were steam aged, dried and blended. The unused catalytic cracking material was amorphous silica/alumina associated with zeolitic material. The aging was carried out in a vessel made of 304 stainless steel for 20 to 24 hours at a temperature cycled between 1180° F. and 1260° F. and under a steam pressure cycled from 15 to 100 psig. The thus aged unused catalytic cracking material was then dried in a quartz reactor fluidized with nitrogen at atmospheric pressure heated to 1200° F. (649° C.). The steam aged unused catalytic cracking material was then analyzed and the results are shown in the following table.

| Properties of Unused Catalytic Cracking Material | | |
|---|---|---|
| | Fresh | Steam Aged |
| Surface Area, m$^2$/g | 190 | 72.3 |
| Pore Volume, cc/g | 0.48 | 0.44 |
| Si, wt. % | 21.0 | |
| Al | 19.1 | |
| Ni | 0.007 | 0.01 |
| V | 0.03 | 0.025 |
| Fe | 0.35 | 0.56 |
| Ce | 0.21 | |
| La | 1.53 | |
| Nd | 0.37 | |
| Ti | 0.45 | |
| Na | 0.49 | |
| K | 0.21 | |
| Sb | <0.01 | <0.01 |

2. Antimony Addition

A first portion of the steam aged unused catalytic cracking material prepared as described above was then impregnated with a solution of antimony tris(0,0-dipropyl dithiophosphate) in cyclohexane. The impregnated unused catalytic cracking material was then heated to apparent dryness on a hot plate, then transferred to a quartz reactor and heated to 900° F. (482° C.) while fluidized with nitrogen gas, 900° F.–1200° F. while fluidizing with hydrogen; thereafter the catalyst was purged with nitrogen for five minutes at 1200° F. Then the catalyst was fluidized with air for 45 minutes at 1200° F. Finally, this catalyst portion was cooled to room temperature with nitrogen fluidizing gas.

3. Evaluation of Unused Catalyst

A sample of the second portion of the steam aged unused catalytic cracking material that did not contain added antimony and a sample of the steam aged antimony containing unused catalytic cracking material prepared as described above were evaluated in a fluid bed reactor system using Borger topped crude oil having the following characteristics:

| OIL INSPECTION DATA | |
|---|---|
| | Borger Topped Crude |
| | (West Texas crude) |
| API Gravity, 60° F. | 20.9 |
| Distillation, D-1160, °F. | |
| 2% OH | 670 |
| 10% | 815 |
| 20% | 895 |
| 30% | 944 |
| 40% | 1001 |
| 50% | 1066 |
| Carbon Res. (RAMS), Wt. % | 5.59 |
| C, Wt. % | 85.8 |
| H, Wt. % | 11.9 |
| N$_2$, Wt. % | 0.27 |
| S, Wt. % | 1.2 |
| Ni, ppm | 5.24 |
| V, ppm | 5.29 |
| Fe, ppm | 29 |
| Na, ppm | 0.9 |
| Pour point, °F. | 70 |
| Viscosity, SUS at 210° F. | 142 |

The oil was preheated to about 200° F. (93° C.) and introduced about 1 inch above the top of the catalyst bed. The cracking conditions in the reactor were:
Temperature: 950° F. (510° C.)
Pressure: Atmospheric
Catalyst/Oil weight ratio: 7/1
Oil Feed Time: 0.5 minutes The gaseous and liquid cracking products were analyzed by gaschromatography and the reactor was weighed to determine coke. Most runs had a materials balance in the range of 100±7%. The results of this evaluation are shown in the next table.

4. Contamination With Metals

Samples of the steam-aged catalyst without added antimony and samples of the antimony containing catalyst were then used for cracking oil with a high content of contaminating metals. The oil has the following inspection data:

OIL INSPECTION DATA

|  | Sweeny Gas Oil (Gulf Coast crude) |
|---|---|
| API Gravity, 60° F. | 25.8 |
| Distillation, D-1160, °F. | |
| 2% OH | 498 |
| 10% | 566 |
| 20% | 621 |
| 30% | 669 |
| 40% | 715 |
| 50% | 759 |
| 60% | 799 |
| 70% | 842 |
| 80% | 895 |
| 90% | 973 |
| 95% | 1047 |
| BMCI | 41.1 |
| Carbon Res. (RAMS), Wt. % | 0.87 |
| $N_2$, Wt. % | 0.07 |
| S, Wt. % | 0.4 |

The oil used was Sweeny gas oil (Gulf coast crude) having added thereto a nickel salt of octanoic acid in a quantity sufficient to provide 0.0007 g Ni per 1 g of oil. Each cracking cycle added about 0.01 weight % Ni to the cracking catalyst. The cracking and regeneration conditions for these cycles were:

Cracking Conditions

| Temperature: | 1025° F. – 950° F. |
|---|---|
| Pressure: | Atmospheric |
| Catalyst/Oil Weight Ratio: | 7/1 |
| Oil Feed Time: | 20 seconds |

Regeneration Conditions

| Temperature: | 1200° F. |
|---|---|
| Air Pressure: | Atmospheric |
| Time: | 15–30 minutes (depending on coke content) |

Between a cracking and a regeneration step, the reactor was purged for 35 sec. with nitrogen.

5. Evaluation of the Contaminated Catalysts

After 5, 10, 20 and 40 cracking and regenerating cycles, both the antimony containing catalyst and the catalyst containing no added antimony were evaluated as described above by cracking Borger topped crude and determining the hydrogen production, the coke production, the gasoline yield. The results of this evaluation are also shown in the following table.

EVALUATION OF CRACKING CATALYST WITH METALS

| Antimony on Unused Catalyst, Wt. % | Nickel Added, Wt. % | Conversion, Vol. % of Feed | Gasoline, Vol. % of Feed | Coke, Wt. % of Feed | SCF $H_2$/ Bbl. Conv. | Material Balance |
|---|---|---|---|---|---|---|
| 0 | 0.0 | 84.8 | 67.8 | 11.0 | 132 | 99.6 |
| 0 | 0.05 | 80.3 | 58.5 | 12.6 | 478 | 96.2 |
| 0 | 0.1 | 80.2 | 56.1 | 13.0 | 605 | 98.2 |
| 0 | 0.2 | 81.4 | 57.9 | 15.3 | 690 | 100.7 |
| 0 | 0.4 | 77.4 | 51.5 | 18.5 | 849 | 97.3 |
| 0.5 | 0 | 75.4 | 67.5 | 9.8 | 152 | 99.7 |
| 0.5 | 0.05 | 72.6 | 57.3 | 11.0 | 272 | 93.8 |
| 0.5 | 0.1 | 78.6 | 60.8 | 12.2 | 353 | 101.5 |
| 0.5 | 0.2 | 77.2 | 63.8 | 12.2 | 446 | 100.6 |
| 0.5 | 0.4 | 75.5 | 61.1 | 13.5 | 707 | 100.6 |
| 0.25 | 0 | 80.0 | 62.5 | 10.2 | 102 | 95.3 |
| 0.25 | 0.05 | 79.5 | 61.6 | 12.4 | 263 | 95.0 |
| 0.25 | 0.1 | 78.3 | 63.5 | 12.1 | 306 | 103.7 |
| 0.25 | 0.2 | 80.2 | 59.2 | 13.2 | 545 | 94.6 |

The results of this table show that a variety of improvements are obtained in a cracking process when an antimony containing cracking catalyst is used as compared to the same process using the same catalyst without antimony. In particular the results show a reduction in coke production; a reduction in hydrogen production (in all but the first evaluation), an increase in gasoline production. All these benefits are achieved while maintaining good catalyst activity. Furthermore, the data show that the rate of increase in hydrogen and coke production is dramatically reduced when the catalyst of this invention is used as compared to the same catalyst with no antimony added to the unused catalytic cracking materials.

Reasonable variations and modifications which will become apparent to those skilled in the art reading the specification and claims can be made in this invention without departing from the spirit and scope thereof.

I claim:

1. A hydrocarbon cracking process comprising contacting a hydrocarbon feedstock in a cracking zone under cracking conditions essentially in the absence of added hydrogen in the presence of a cracking catalyst at least a portion of which is a cracking catalyst consisting essentially of an unused catalytic cracking material useful for cracking of hydrocarbons in the absence of added hydrogen, said material containing less than about 40 wt. % zeolite and antimony in an amount sufficient to inhibit detrimental effect of contaminant materials when said cracking catalyst is employed in a hydrocarbon cracking process, wherein said antimony is derived from an antimony tris (0,0-dihydrocarbyl dithiophosphate), and thereafter withdrawing cracked hydrocarbons from said cracking zone as the product of the process.

2. A process in accordance with claim 1 wherein said hydrocarbon feedstock contains at least one contaminating metal selected from the group consisting of nickel, vanadium and iron.

3. A process in accordance with claim 2 wherein said hydrocarbon feedstock contains at least one of the three metals nickel, vanadium and iron, in concentrations in the ranges of
  about 0.2 to about 100 ppm of nickel,
  about 0.2 to about 500 ppm of vanadium,
  about 0.2 to about 500 ppm of iron,
with the further provision that the total content of the three metals is in the range of about 0.2 to 1100 ppm of metals.

4. A process in accordance with claim 1 wherein said portion of said cracking catalyst is obtained by combining said unused catalytic cracking material and said antimony tris (0,0-dihydrocarbyl dithiophosphate.

5. A process in accordance with claim 4 wherein said portion of said cracking catalyst is obtained by impregnating said unused catalytic cracking material with said antimony tris (0,0-dihydrocarbyl dithiophosphate.

6. A process in accordance with claim 1 wherein said portion of said cracking catalyst contains said antimony source in a concentration of about 0.005 to about 5 wt. % calculated as elemental antimony based on said unused catalytic cracking material.

7. A process in accordance with claim 1 wherein said unused catalytic cracking material is a silica-based material.

8. A process in accordance with claim 1 wherein said unused catalytic cracking material is a silica/alumina-based material.

9. A process in accordance with claim 1 wherein said unused catalytic cracking material is a silica/alumina-based material containing about 5 to about 30 wt. % of a zeolitic material.

10. A process in accordance with claim 1 wherein said antimony is derived from antimony tris(0,0-dipropyl dithiophosphate).

11. A process in accordance with claim 1 comprising
  a. introducing said hydrocarbon feedstock into said cracking zone,
  b. introducing said cracking catalyst into said cracking zone,
  c. withdrawing spent cracking catalyst from said cracking zone,
  d. introducing said spent cracking catalyst withdrawn from said cracking zone into a regeneration zone,
  e. contacting said spent cracking catalyst in said regeneration zone under regenerating conditions with a free oxygen-containing gas to regenerate said cracking catalyst and to form regenerated cracking catalyst,
  f. recycling said regenerated cracking catalyst into said cracking zone.

12. A process in accordance with claim 1 wherein a makeup quantity of unused catalytic cracking material containing antimony is continuously or intermittently introduced into the process.

13. A process in accordance with claim 1 wherein said makeup quantity of unused catalytic cracking material containing antimony is added to the regeneration zone.

* * * * *